United States Patent [19]

Gathings

[11] 4,193,331
[45] Mar. 18, 1980

[54] ADJUSTABLE MEASURING GUIDE ATTACHMENT FOR A PICTURE FRAME MITERING APPARATUS

[76] Inventor: David L. Gathings, 4875 Ridenour Dr., Colorado Springs, Colo. 80916

[21] Appl. No.: 963,810

[22] Filed: Nov. 27, 1978

[51] Int. Cl.² .............................................. B26D 7/16
[52] U.S. Cl. .......................................... 83/468; 83/581
[58] Field of Search ................ 83/467, 468, 465, 581, 83/522; 269/315, 303–305

[56] References Cited

U.S. PATENT DOCUMENTS

| | | | |
|---|---|---|---|
| 3,941,020 | 3/1976 | Huntley et al. | 83/468 |
| 4,056,030 | 11/1977 | Hahn | 83/581 X |
| 4,122,739 | 10/1978 | Marlow | 83/468 X |

*Primary Examiner*—J. M. Meister
*Attorney, Agent, or Firm*—W. Britton Moore

[57] ABSTRACT

An adjustable measuring guide attachment for a picture frame mitering apparatus for miter cutting high double and single rabbited molding strips to predetermined lengths for assembly in particular sized picture frames. The attachment includes a graduated measuring strip adhered to and for highlighting the ruled horizontally extending molding strip supporting arm of the mitering apparatus, and a measuring guide having an angularly slidably adjustable rabbit locator and transparent angularly extending measuring locator member thereon which is affixed to the molding strip retaining bar arranged for slidable adjustment on the supporting arm. An elongated rabbited molding strip, having its leading end mitered, is flatly positioned on the supporting arm with one mitered end abutting the rabbit locator. The retaining bar and measuring guide is slidably adjusted on the arm until the transparent locator member indicates that the predetermined cutting measurement has been reached, whereupon the bar and measuring guide are locked thereat to fixedly position the molding strip on the arm. Actuation of the mitering apparatus causes the opposing end of the molding strip to be mitered to produce a strip of the exact length for frame assembly.

10 Claims, 17 Drawing Figures

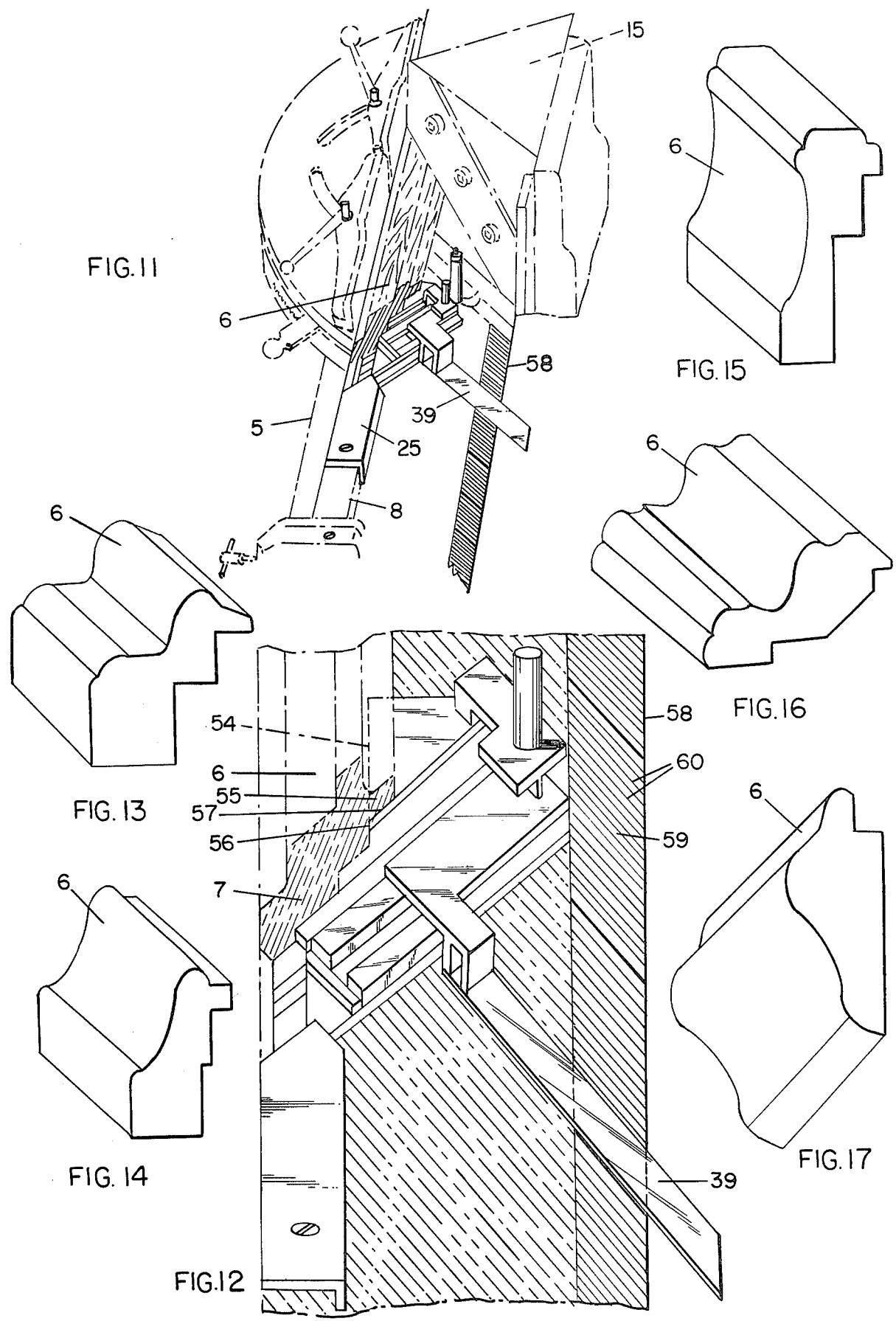

ADJUSTABLE MEASURING GUIDE ATTACHMENT FOR A PICTURE FRAME MITERING APPARATUS

This invention relates to an attachment for a picture frame mitering apparatus and the adjustable retaining bar on the supporting arm thereof, whereon lengths of rabbited molding strips having their leading ends mitered are flatly and fixedly supported, and including a measuring guide and adjustable rabbit locator affixed to the retaining bar for indicating the predetermined length of the molding strip and so positioning the unmitered end to be severed relative to the cutting apparatus to enable a mitered strip of the precise needed measurement for frame assembly being produced.

BACKGROUND OF THE INVENTION

Various means have heretofore been employed to provide mitered molding strips of predetermined lengths to produce picture frames, such as by mitering the opposing ends thereof in conventional miter box cutting devices, or in the miter fixture devices of U.S. patents to Novak U.S. Pat. No. 3,842,700 and Hahn U.S. Pat. No. 4,056,030, and the combined measuring and sawing device of Huntly U.S. Pat No. 3,941,020. However, none of these prior art devices have been satisfactory for handling and precisely measuring high double rabbited molding strips so as to enable such strips being severed and mitered at both ends to the precise measurements required in the production of customized frames.

In addition, it has been proposed to produce mitered molding picture frames in a miter chopping apparatus including an upright frame with a vertically reciprocable V-shaped cutting or sawing head thereon and having a horizonatally disposed supporting arm upon which a molding strip is flatly supported. By positioning a molding strip with its leading end previously mitered thereon and moving the cutting head downwardly relative to the strip the latter is severed at generally the length required for frame assembly. However, in this conventional and prior art type of mitering equipment, with which the present measuring guide attachment is intended for use, it has not been possible to effectively and precisely measure high double rabbited molding strips so as to sever and miter the same at the exact length measurements required, which will not require any further finishing for correct fitting.

The principal object of the present invention is to provide an adjustable measuring guide attachment for the molding strip retaining bar on the supporting arm of a miter chopping apparatus and wherein a molding strip is placed with its leading end mitered and adjustably moved relative to the chopping or cutting head at the precise position an end thereof is to be mitered.

Another object is the provision of an adjustable measuring guide attachment including an angularly slidable rabbit locator for correctly aligning, positioning, and locating the upper rabbited edge of a strip of high double rabbited molding at the exact measurement at which the other end of the strip is to be mitered to effect a finished strip for frame assembly.

Still another object is to provide a measuring guide attachment having an angularly extending transparent measuring locator member thereon alignable with a graduated scale on the chopper supporting arm for precisely indicating the exact predetermined cutting measurement at which the end of the molding strip is to be severed for assembly into a frame of predetermined size.

A further object is the provision of a measuring strip having varying colored graduations thereon and adhered to and above the graduated scale on the supporting arm so as to highlight and distinguish the scale inch increment thereon when the transparent measuring locator member is alignable therewith.

Still another object is to provide a measuring guide attachment wherein the base thereof is attached to the molding strip retaining bar on the miter chopper supporting arm and projects laterally therefrom at a forty-five degree angle to form an abutment for a mitered end of the molding strip and slidably support an extension thereon in turn slidably adjustably supporting the transparent locator member and a flat longitudinally and vertically adjustable rabbit locator thereon which interfits under the rabbited edge of the strip and securely positions and aligns the same for lingitudinal movement on the supporting arm relative to the chopping head.

These and other objects and advantages will be apparent as the specification is considered with the accompanying drawings, wherein FIG. 1 is a perspective view of a miter chopping apparatus and the molding strip supporting arm thereon, with the adjustable measuring guide attachment mounted thereon;

FIG. 11 is a top plan view, similar to FIG. 6, but with the adjustable measuring guide attachment assembled on the retaining bar;

FIG. 12 is a top perspective view of the supporting arm, retaining bar, and measuring guide attachment with the rabbit locator interfitting the upper rabbited edge of a high double rabbited molding strip; and FIGS. 13–17 are perspective sectional views of various shapes of rabbited molding which may be mitered in the present apparatus.

Figure 1:
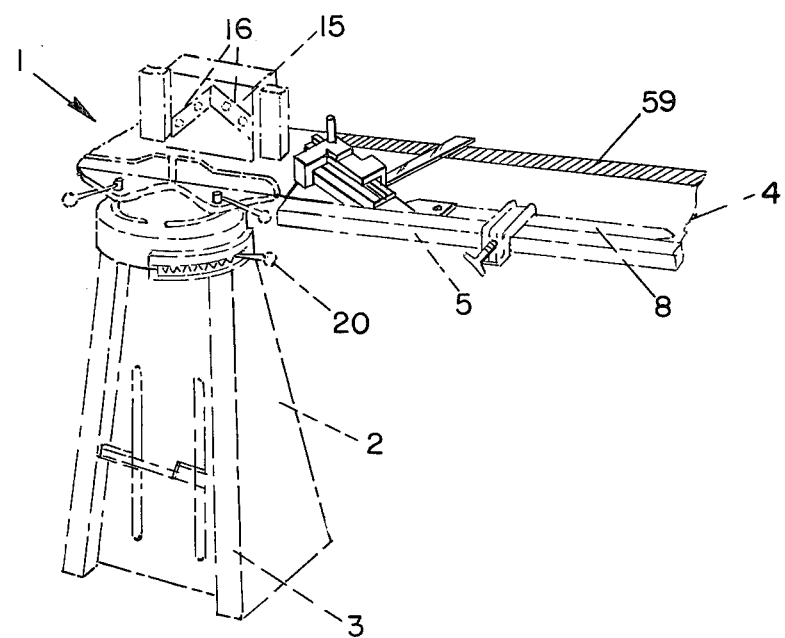
Figure 2:
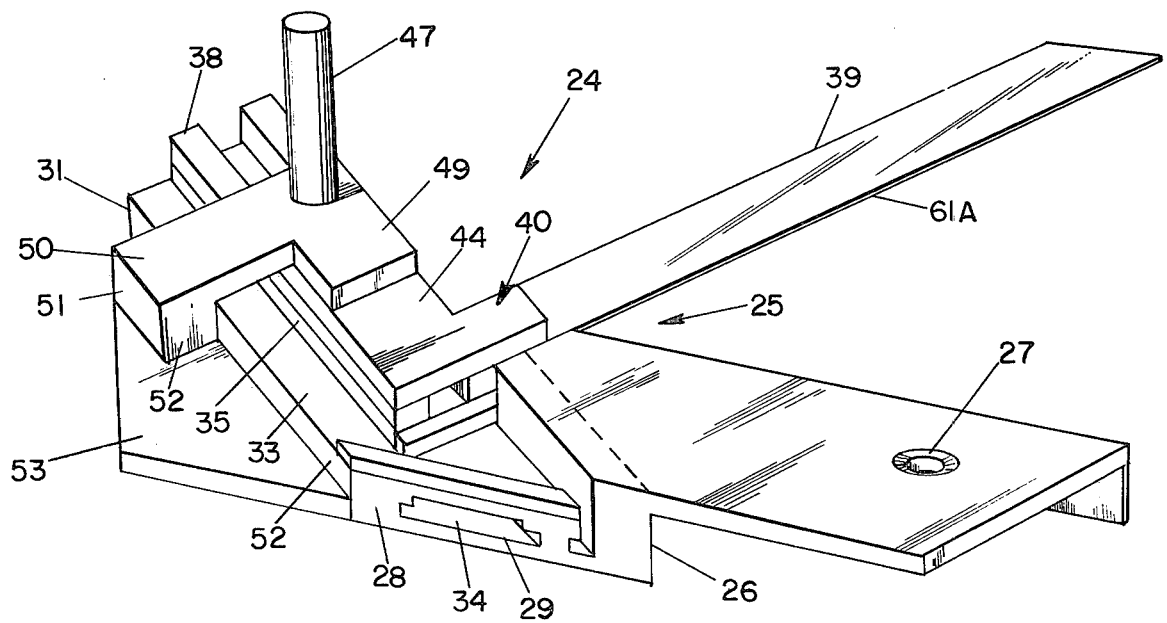
FIG. 2 is a persepective view of the measuring guide attachment detached from the molding strip retaining bar.
Figure 3:
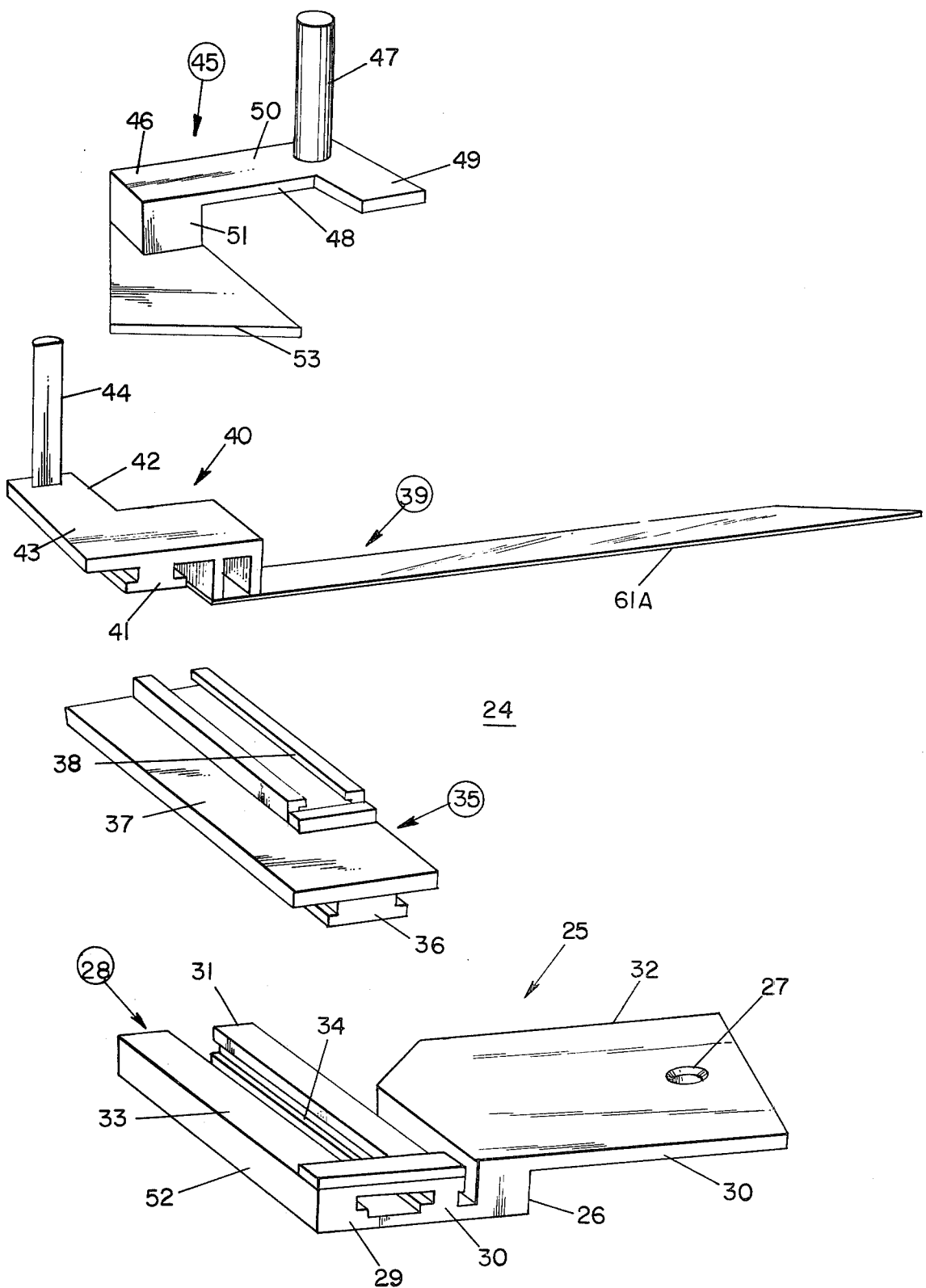
FIG. 3 is an exploded view of the measuring guide attachment and the various component parts thereof.

Referring more particularly to the drawings, wherein similar reference characters designate like parts throughout the several views, numeral 1 generally indicates a conventional miter chopping or cutting apparatus, which represents the type of equipment with which the present measuring guide attachment is intended for use. Accordingly, this miter chopper has only been generally illustrated in FIGS. 1, 4, 5, 6, 8 and 11 and is so hereinafter described to represent the organization and manner of use of the attachment therewith. However, except that the attachment is used and combined with such a mitering device, the latter does not constitute a part of the present invention.

The miter chopper includes an upright frame 2 supported at its corners by four legs 3 with a horizontally disposed and laterally projecting flat molding strip supporting arm 4 suitably attached thereto at the upper end thereof. A metal guide bar 5 is fixedly arranged on and extends lengthwise of the forward edge of arm 4 and serves to flatly retain a rabbited molding strip 6 thereon, with its previously mitered outer end 7 abutting a forty-five degree (45°) angled inner end 9 of a flat retainer bar 8, positioned on arm 4 parallel to and in engagement with the inner edge of guide bar 5. The retainer bar 8 and guide bar 5 are coupled together by a suitable clamping device, such as U-shaped clamp 10 with a screw tightener 11 extending thereinto. Thus, by tightening the latter, the bars are drawn together and fixed relative to the arm 4, in an obvious manner, and, conversely, when the screw 11 is loosened, retainer bar 8 may be slidably adjusted lengthwise relative to guide bar 5. This allows molding strip 6 with its previously mitered outer end 7 to be moved along the angularly extending parallel graduated marking lines 13 of a scale 12, suitably inscribed on the flat upper surface of arm 4 so as to aline with the measurement increments at which the molding strip is to be severed and mitered, as will hereinafter be more fully described.

Figure 4:
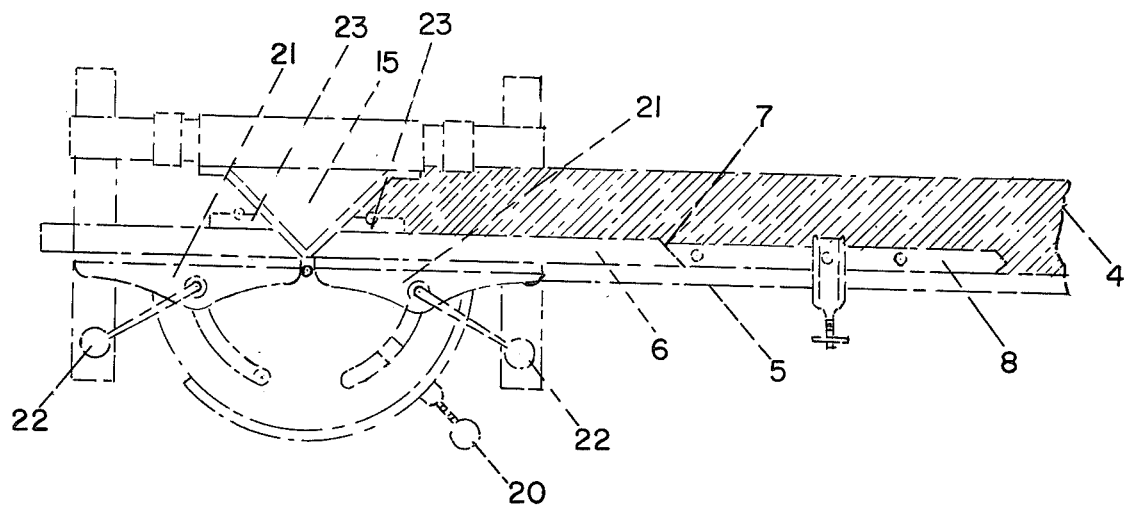
FIG. 4 is a top plan of a miter chopping apparatus, with supporting arm and retaining bar and molding strip with its leading end mitered thereon, but with the measuring guide attachment disassembled therefrom.
Figure 5:
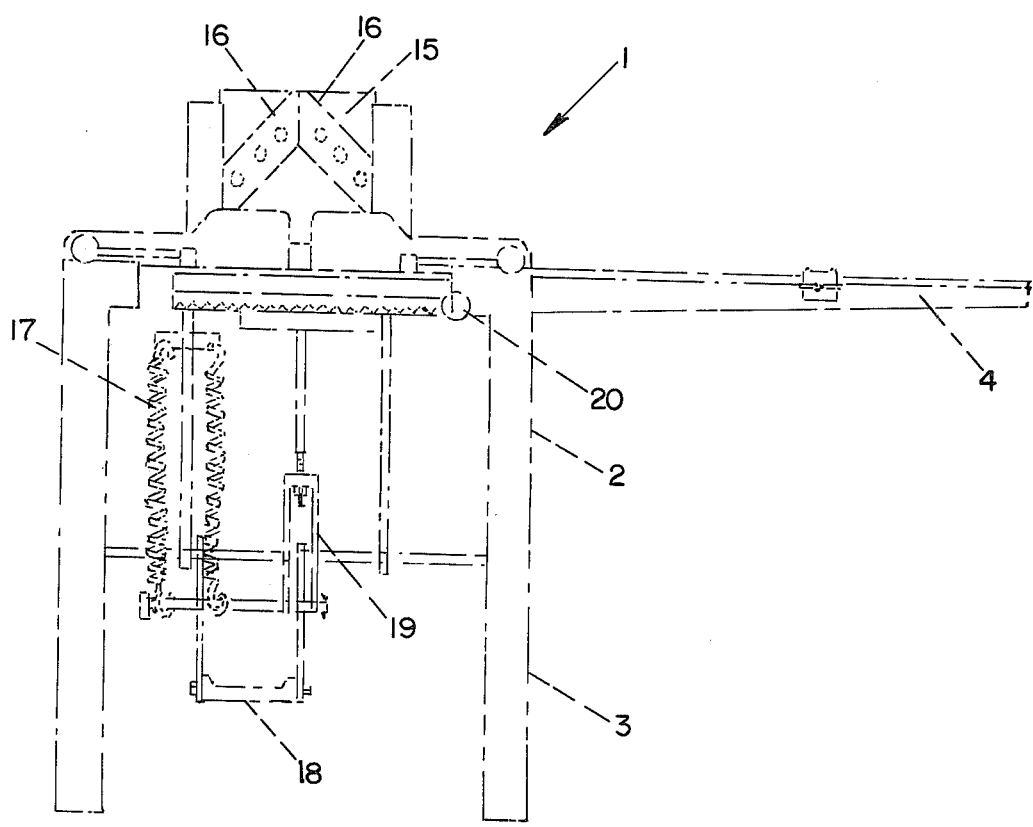
FIG. 5 is a front elevation of a miter chopping apparatus.
Figure 6:
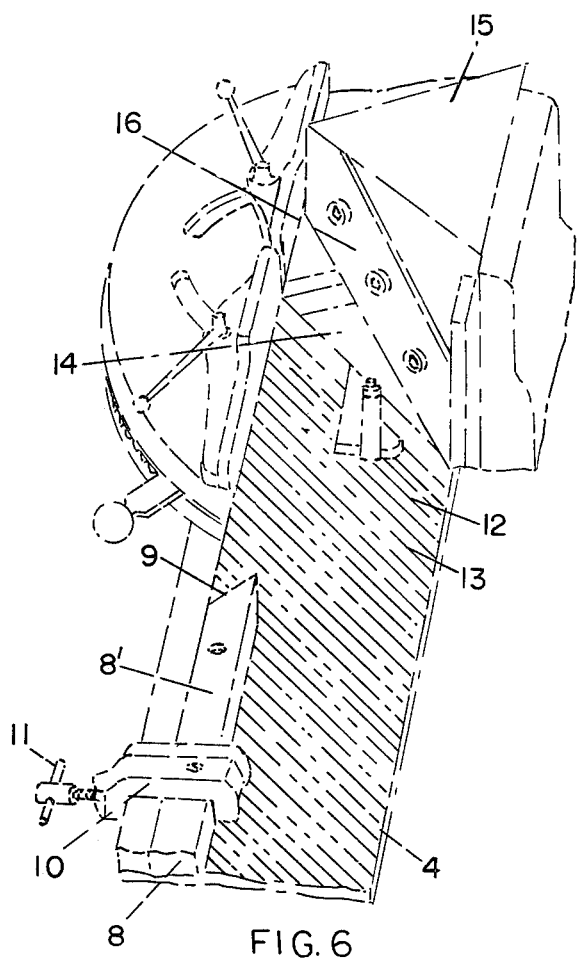
FIG. 6 is a top perspective of the V-shaped cutting or chopping head of the miter chopper, but with the measuring guide attachment disassembled from the retaining bar.
Figure 7:
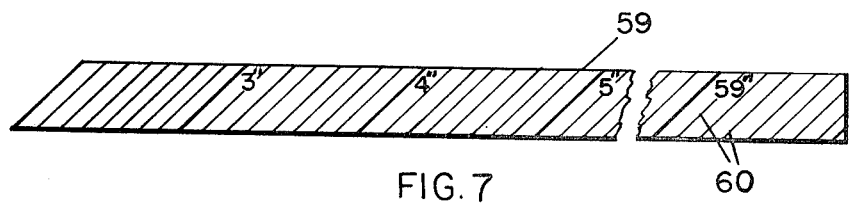
FIG. 7 is a top plan of a measuring strip adhesively secured to the graduated scale surface of the chopper molding strip supporting arm.
Figure 8:
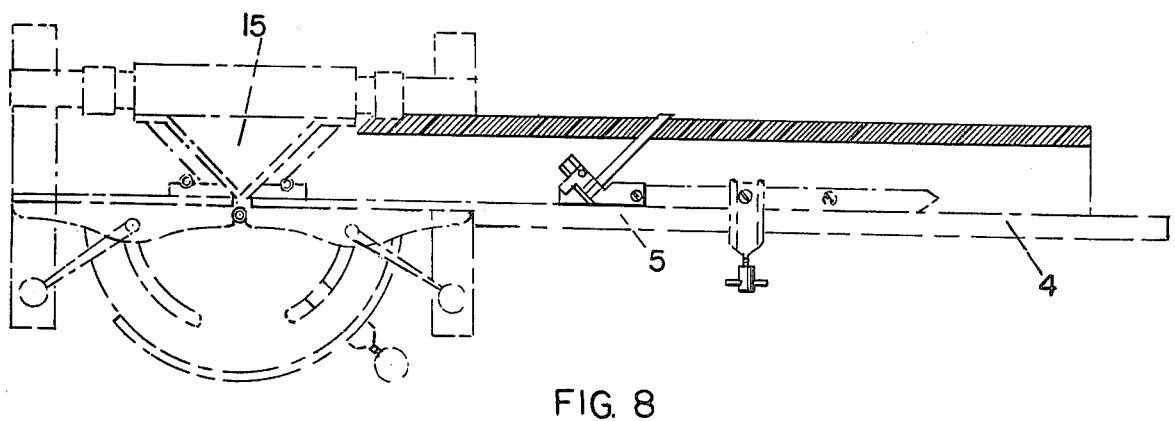
FIG. 8 is a top plan of a miter chopping apparatus with the adjustable measuring guide attachment affixed to the molding strip retaining bar.
Figure 9:
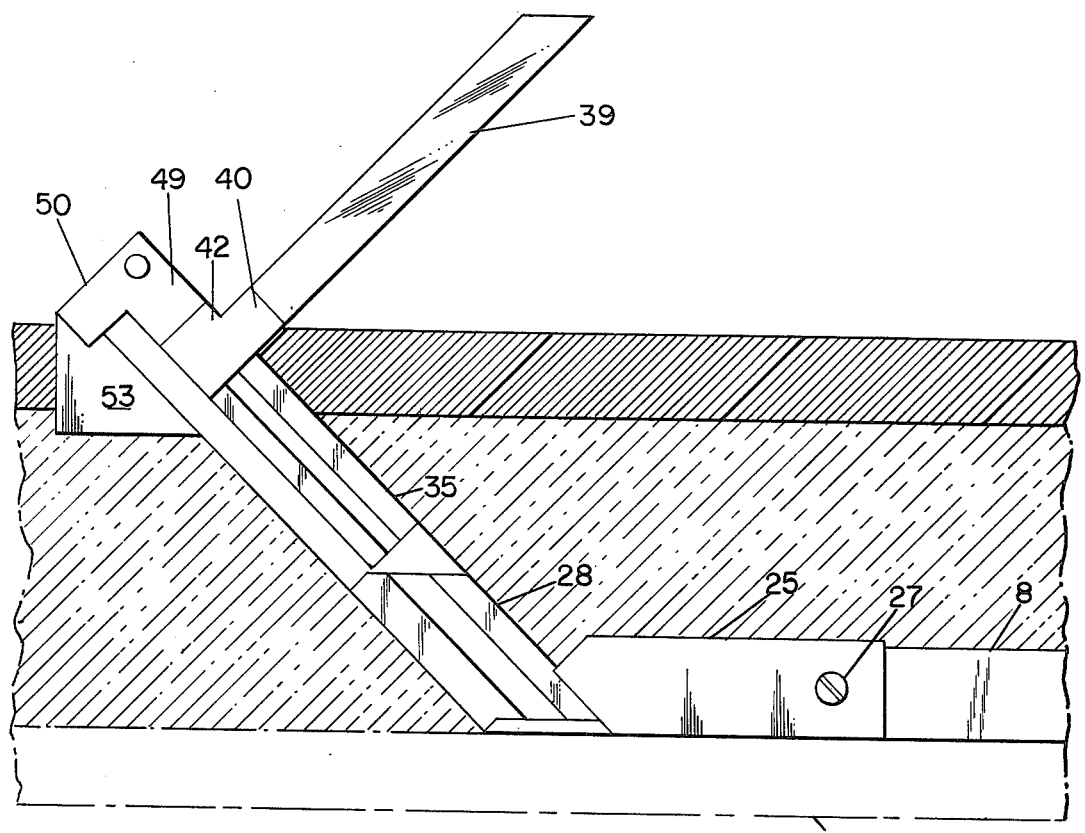
FIG. 9 is a top plan of the adjustable measuring guide attachment, with the rabbit locator and transparent locator member fully extended relative to the measuring strip and supporting arm.
Figure 10:
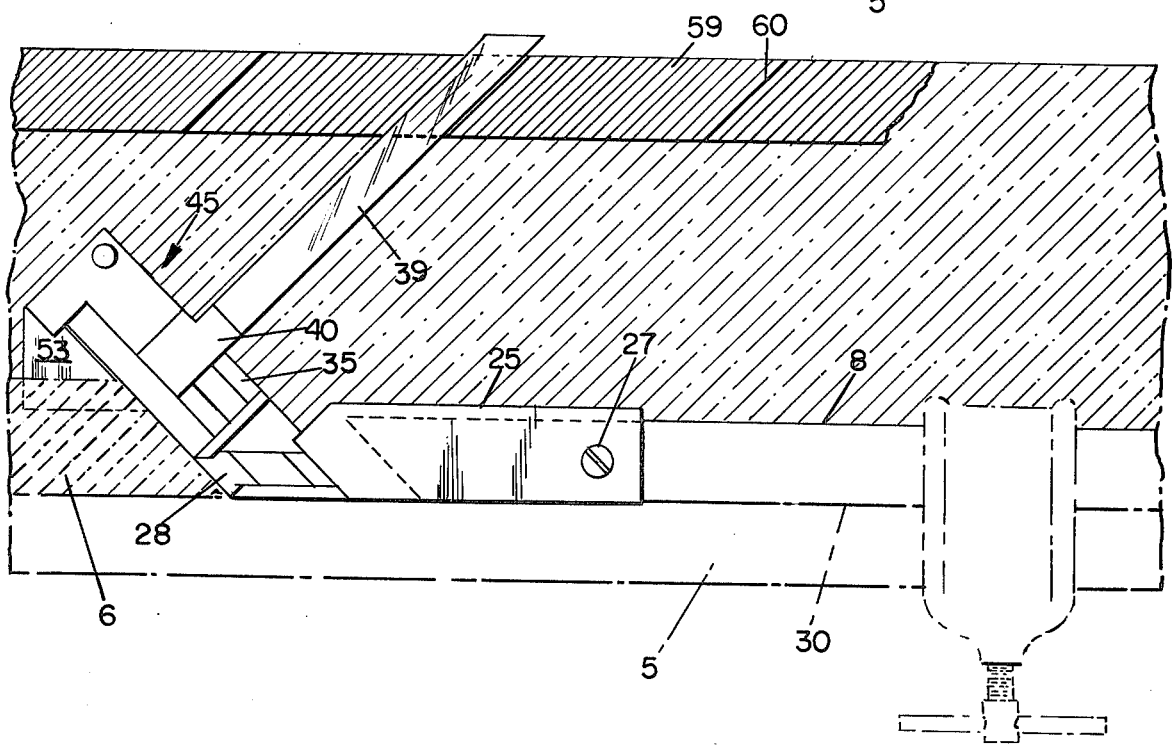
FIG. 10 is a top plan view, similar to FIG. 9, but with the attachment and the rabbit and transparent locators in normal collapsed positions relative to the retainer bar.

It will be understood that the molding strip 6 to be mitered in the present apparatus is an elongated strip of standard molding wherein the leading right hand end 7 has been previously mitered at angles of forty-five degrees (45°). Thus, when the molding strip is positioned on the supporting arm 4, the mitered outer or right hand end 7 thereof, viewing FIG. 4, is pushed flush against the angled inner 3nd 9 of retainer bar 8, and the opposing end of the strip projects transversely of the apparatus and spans an opening 14 (FIGS. 6 and 11) in the upper end of frame 2 below a triangularly-shaped chopper or cutter head 15, projecting upwardly through and vertically reciprocable therethrough. Cutting head 15 has flat vertically disposed cutting blades or saws 16 attached to and depending from the opposing side walls thereof, and is mounted at the upper end of a spring-pressed frame 17 extending downwardly through the opening 14 in main frame 2. A foot pedal 18 is pivotally connected to the lower end of and at the front of mounting frame 17 and is connected by suitable linkage 19 to the cutting head 15 so that, when foot pressure is applied thereto, head 15 is pulled downwardly, against spring tension, and causes the two blades or saws 16 to chop across and sever the molding strip 6 by removing a V-shaped section from a portion thereof. Thus, this cutting action of the chopping blades severs the molding strip into two sections by forming two forty-five degree (45°) angles opposing each other in the adjacent ends of the two sectons. Upon release of pressure from pedal 18, the cutting head 15 is returned upwardly through the opening 14 by spring pressure to its normal inactive elevated position above the molding strip.

In the elevated inactive position of cutter head 15, the latter will project forwardly and angularly upwardly (see FIGS. 1, 5, 6 and 11) and is suitably interconnected by linkage, not shown, to a lever 20 projecting forwardly of the apparatus below the supporting arm. Thus, during the foot controlled downward movement of the cutter head 15, the operator may arcuately move lever 20 and cause a forward and downward pivotal or rocking movement of and cause the cutter blades to be drawn across the molding strip in somewhat of a sawing action. In this connection, several cutting or chopping strokes of the cutter head may be required before the molding strip is completely severed.

When the elongated molding strip is in position for mitering, as described above, the back or underside lower edges thereof will be butted against guide bar 5. A pair of spaced pivotally mounted angle of degree plates 21 are arranged in the frame opening on a plane with supporting arm 4 and are provided with knobbed adjusting handles 22 for arcuately moving plates 21 to vary the angles being cut in the strip, in an obvious manner, should such be required. In addition, a pair of spaced pivoted molding top edge holders 23 are suitably mounted relative to the cutting head 15 and are movable into abutting engagement with the top edge of the molding strip and are adjustable vertically, so as to interfit the rabbited underside of the molding strip and securely support the latter during the cutting strokes. This, of course, prevents the rabbited section thereof from breaking loose from the strip during cutting.

The foregoing explains the procedure of how a miter chopper is used to measure, sever, and miter a strip of molding into a predetermined length for assembly in particular sized picture frames without using the adjustable measuring guide attachment.

Separate and apart from the above operation is the cutting, measuring and mitering procedure with the present adjustable measuring guide attachment 24 arranged thereon, as hereinafter described. Thus, this attachment includes an elongated flat base portion 25 upwardly offset, as at 26, to overlap and flatly engage the upper face 8′ of retainer bar 8 and be fixedly attached thereto by a suitable screw fastener or the like 27 so as to constitute an aligned extension of bar 8. When so interconnected, the offset 26 will abut the inner end wall of bar 8. Integrally formed on and projecting upwardly and inwardly at an angle of forty-five degrees (45°) from base 25 is a flat extension 28, wherein the lower end wall 29 thereof is on a plane with the lower edge 30 of base 25 so that both will be parallel to and flatly engage inner edge of guide bar 5. The upper end wall 31 of extension 28 will project somewhat beyond and is spaced, from but parallel to the upper edge 32 of extension 25.

A longitudinally extending T-shaped key slot 34 is formed in the upper face 33 of extension 28 and slidably receiving and interfitting with an elogated flat extension plate 35. The latter is formed with a downwardly depended inverted T-shaped tongue 36 slidably interfitting slot 34 in extension 28 so as to constitute an extension thereof when assembled thereon. An elongated inverted T-shaped track 38 is formed in the upper face 37 of plate 35 and projects inwardly therefrom to, in turn, slidably and interfittingly receive an inverted T-shaped tongue 41, formed on and depending from the base 40 of a generally L-shaped locator arm 39.

Locator arm 39 is flat and downwardly offset from base 40 and projects upwardly therefrom at an angle of forty-five degrees (45°) so as to extend parallel to the forty-five degree marking increment lines 13 on supporting arm scale 12, for a purpose presently to be described. Projecting upwardly from leg 42 of the L-shaped base 43 of locator arm 39 is a semi-circular pin 44 which slidably projects upwardly into and interfits a similar semi-circular interior, not shown, of a hollow post 47, formed on and upstanding from the flat upper wall 46 on an L-shaped locator plate 45, disposed thereabove. Due to the interfit between semi-circular pin 44 and post 47, relative slidable adjustment therebetween may be effected.

Rabbit locator plate 45 has a flat underside 48 so that leg 49 thereof will flatly engage and be supported by the flat upper face 43 on leg 42 of locator arm base 40, when the pin 44 of the latter is interconnected with post 47. Thus, the elongated flat leg portion 40 of rabbit locator plate 45 will project laterally from and above leg 43 therebeneath, and is offset downwardly, as at 51, to engage with a side edge 52 of extension 28 on base portion 25. A flat generally triangular rabbit locator plate 53 is formed on and extends downwardly from offset 51, and, when the four component attachment parts 28, 35, 39 and 45 are superposed on each other and interconnected, as hereinabove described, the flat 45° side edge 52 will be aligned with and abut the mitered outer end 7 of rabbited molding strip section 6, positioned on chopper arm 4 in engagement with guide bar 5.

As best shown in FIGS. 11 and 12, when the molding strip is so arranged on the chopper arm, the extension plate 35, locator arm base 40, and locator plate 45 may be longitudinally slidably adjusted by grasping and moving post 47 until the lower straight edge 54 of the flat rabbit locator plate 53 is pushed under an upper edge 55 (FIG. 13) of molding strip 6 and is butted flush against center rabbited edge 56 thereof. Vertical adjustment of post 47 also enables rabbit locator plate 53 to be vertically moved into snug flat engagement with the under side wall 57 of the rabbited edge so that the molding strip can be measured accurately. The molding strip is now ready to be longitudinally moved on chopper arm 4 into position for mitering the inner end thereof at the exact predetermined length measurement required, as presently to be described.

A measuring strip or tape 59, with forty-five degree (45°) slanting scale lines 60 on the outer face thereof, is suitably adhesively removably affixed to the flat upper face of chopper arm 4 and extends lengthwise thereof adjacent and parallel to the upper edge 58. Scale lines 60 are in alignment with and are extensions of the similarly slanting scale increment lines 13 on chopper arm scale 12. The latter may be suitably numbered or otherwise marked to designate the usual measurement increments of a scale, and the lines 60 may be variously colored to highlight the particular fractional measurement line 13 on scale 12 at which the locator arm stops during its measuring travel thereover, as hereinafter described.

The locator arm 39, projecting from its base 40, is flat and relatively narrow and is of a suitable transparent material, such as plastic, and extends upwardly at a forty-five degree (45°) angle across scale 12 and measuring tape 59. The straight side edge 61A of arm 39 is alignable with the scale increment lines 13, during slidable adjustment of the measuring guide attachement 24.

With the rabbit locator plate 53 in engagement with the center rabbited edge 56 and the under side wall 57 of molding strip 6, and the mitered outer end 7 thereof in abutting engagement with the side edge 52 of extension, the moldings strip is now ready to be measured. This is accomplished by unlocking the clamping device 10, by loosening screw 11, and freeing retainer bar 8 from its attachmentto guide bar 5 to permit of manual longitudinal sliding movement of the retainer bar 8, in the appropriate direction, relative to guide bar 5 and chopper head 15. During such movement, locator arm 39 will sweep or travel across scale 12 until the lower straight side edge 61A thereof is aligned with the appropriate measurement lines 13 and 16 on scale 12 and strip 59, respectively, which indicates that the predetermined cutting measurement at which the other end of the molding strip is to be mitered by cutting head 15 has been reached. Retightening of screw 11 re-attaches the retainer bar 8 to guide bar 5 and holds the molding strip in a fixed position during subsequent mitering of the opposing end thereof. After the latter operation has been effected, the exactly measured and mitered molding strip may be removed for assembly into the frame, and is replaced with such other strips as will be required for forming a particularly dimensional frame with mitered corners.

It will thus be noted that molding strips of various rabbited molding shapes, widths, and lengths may be handled with the present equipment, and that a length of molding previously mitered at one end may be securely and correctly positioned and longitudinally adjusted and precisely measured to the exact point or position at which one end is to be mitered.

While a preferred embodiment of adjustable measuring guide attachment for a picture frame mitering apparatus has been shown and described, it is to be understood that various changes and improvements may be made therein without departing from the scope and spirit of the appended claims.

What I claim is:

1. In combination with a picture frame mitering apparatus including an upright frame with a vertically reciprocable triangularly shaped cutting head therein, and a horizontally disposed and transversely extending flat supporting arm thereon, scale means on said arm, guide bar means at the forward edge of said arm for retaining a length of mitered rabbited molding strip thereon, retainer bar means associated in parallel engagement with said guide bar means, of a measuring guide attachment comprising a flat base extension attached endwise of said retainer bar and extending angularly therefrom at forty-five (45°) degrees, several flat superposed plate members slidably arranged on said base and being slidably interconnected for lengthwise adjustment relative thereto to provide edge means thereon at an angle of forty-five (45°) degrees for engaging with one mitered end of said rabbited molding strip, flat locator arm means on one of said plate members and projecting over said scaled supporting arm at an angle of forty-five (45°) degrees for alignment with the scale markings thereon, and an angularly shaped flat rabbit locator plate arranged on one of said plate members and projecting forwardly therefrom for interfitting under said mitered rabbited molding strip whereby said retainer bar and measuring guide attachment securely retain said molding strip on said arm for lengthwise measuring adjustment thereof until a predetermined length measurement is reached at which the opposing end of said strip is severed to provide a rabbited molding strip of exact measurement for assembly into a frame.

2. In a combination apparatus, according to claim 1, wherein said flat base section includes an elongated portion fixedly attached to said retainer bar, and a portion extending upwardly therefrom at an angle of forty-five (45°) degrees, and said flat plate members are superposed on said angular base portion and are arranged for longitudinal sliding adjustment relative thereto and in alignment therewith.

3. In a combination apparatus, according to claim 2, wherein said flat locator arm means is transparent and the scale markings on said supporting arm extend at a forty-five (45°) degree angle.

4. In a combination apparatus, according to claim 3, wherein there are at least four flat superposed plate members.

5. In a combination apparatus, according to claim 4, wherein said lowermost first flat angularly extending base portion is slotted, and said second flat plate thereabove is formed with depending slide means thereon for slidably interfitting said slotted base portion.

6. In a combination apparatus, according to claim 5, wherein said second flat plate member is slotted on its upper face, and said third plate member is formed with depending slide means thereon for slidably interfitting said slotted second member.

7. In a combination apparatus, according to claim 6, wherein said flat transparent arm means is carried by said third plate member, and the rabbit locator plate member is arranged above said third plate member and is vertically adjustable relative thereto 8. In a combination apparatus, according to claim 6, wherein said rabbit locator plate member has an upwardly projecting hollow handle means, and said third plate member therebeneath has an upstanding pin thereon receivable in said hollow handle means, and said rabbit locator plate projects laterally from said third plate member and is offset downwardly and is formed with a triangularly-shaped rabbit locator plate member thereon for extending beneath and engaging with the mitered end of said rabbited molding strip for measuring adjustment and cutting.

9. In a combination apparatus, according to claim 8, wherein said hollow handle means provides a semi-circular cross sectioned socket, and said upstanding pin on said third plate member is semi-circular in cross section whereby when said pin and handle are interfitted only vertical adjustment thereof may be effected.

10. In a combination apparatus, according to claim 9, wherein graduated measuring tape means is adhered to said suppporing arm and is formed with scale markings alignable with the forty-five degree (45°) scale markings on said supporting arm scale so that when the transparent locator arm means is aligned with a marking thereon the latter will be readily distinguished.

* * * * *